United States Patent [19]
Champaigne

[11] Patent Number: 5,780,714
[45] Date of Patent: Jul. 14, 1998

[54] CALIBRATION APPARATUS AND METHOD FOR SHOT BLASTING INTENSITY MEASUREMENT

[75] Inventor: Jack Champaigne, South Bend, Ind.

[73] Assignee: Electronics, Incorporated, Mishawaka, Ind.

[21] Appl. No.: 832,038

[22] Filed: Apr. 3, 1997

[51] Int. Cl.⁶ .................................................. G01B 3/30
[52] U.S. Cl. .................................................. 73/1.79; 33/567
[58] Field of Search .................................. 73/1.01, 1.79, 73/1.81, 11.02; 72/53; 33/567, 567.1, 504.15

[56]                    References Cited

U.S. PATENT DOCUMENTS

| | | | |
|---|---|---|---|
| 2,350,440 | 6/1944 | Almen | 73/11.02 |
| 3,695,091 | 10/1972 | Smith | 73/11.02 |
| 4,102,176 | 7/1978 | Fuchs | 73/11.02 |
| 5,297,418 | 3/1994 | Champaigne | 73/11.02 |
| 5,448,361 | 9/1995 | Patton | 356/384 |

*Primary Examiner*—Hezron E. Williams
*Assistant Examiner*—Nashmiya Fayyaz
*Attorney, Agent, or Firm*—Baker & Daniels

[57]     ABSTRACT

A calibration apparatus and method for shot blast intensity measuring gages uses a calibration block which is placed upon the measuring surface of the gage. The calibration block has a zero datum surface with a notch cut into the zero datum surface at a predetermined calibration depth. The measuring block is sufficiently shorter than the test strips such that the measuring block can be shifted between a zero datum reference position in which the flat surface is supported over the plunger which operates the read-out display. The measurement block is then shifted relative to the measurement surface to a second position in which the plunger or feeler of the display engages the notch to permit a calibration reading to be taken. Since the measurement block is supported on the same surface when both the zero datum measurement and the calibration measurement are taken, accuracy is improved since it is assured that the calibration measurement is referenced from the same flat surface from which the zero datum measurement is taken.

12 Claims, 3 Drawing Sheets

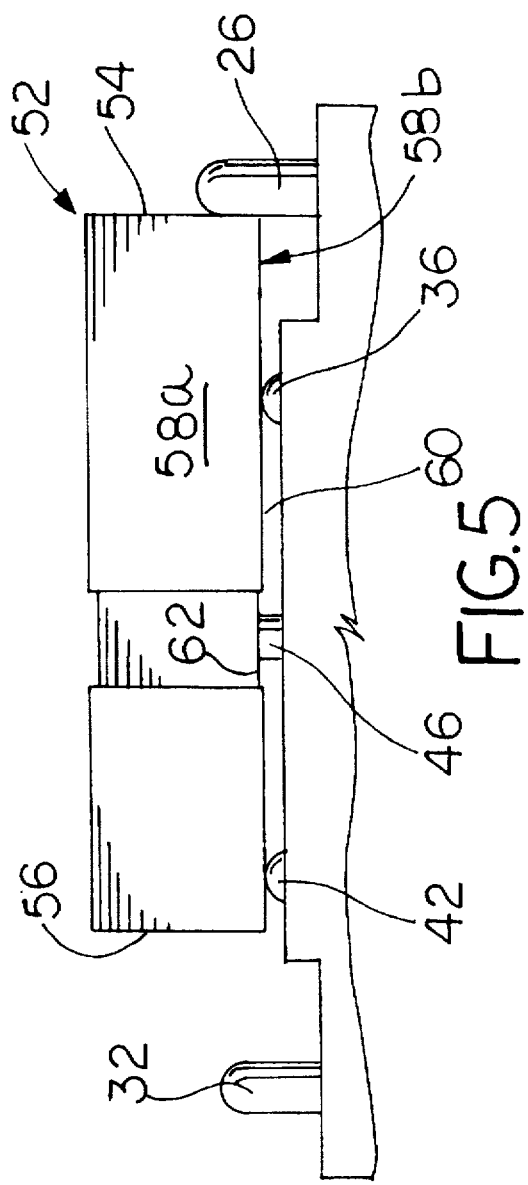
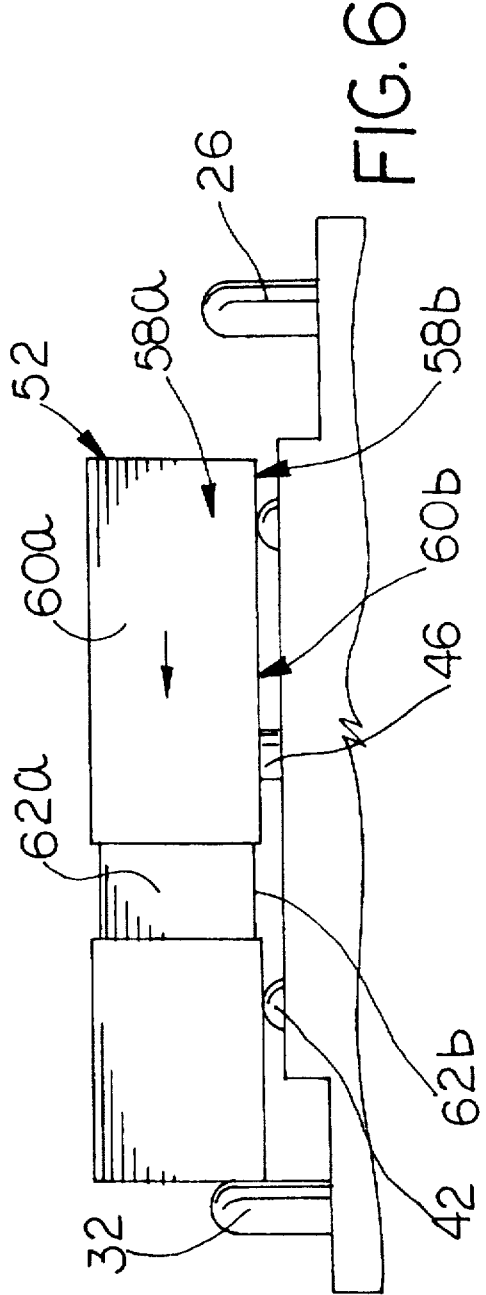

CALIBRATION APPARATUS AND METHOD FOR SHOT BLASTING INTENSITY MEASUREMENT

This invention relates to an improved apparatus and method used for the calibration of Almen gages used in measuring the intensity of shot blasting.

BACKGROUND OF THE INVENTION

Gages of the general type disclosed in U.S. Pat. No. 2,350,440 (Almen), commonly referred to as "Almen gages," have been used for many years to measure the intensity of shot blasting. Almen gages measure the curvature of thin metal test strips after one side of the strips have been exposed to shot particles, and consist of either analog or digital indicators. A measurement is effected by measuring the displacement of the center of the test strip with respect to a zero datum. Almen gages are precision instruments and must be extremely accurate. Accordingly, Almen gages must be recalibrated on a regular basis.

The calibration process consists of establishing a zero datum with the plunger of the indicator resting against a flat surface and then forcing the indicator plunger through a known range of distance and recording the response shown on the dial (or digital display). This known distance can be generated by a precision calibration stand that imparts a known amount of travel to the plunger or by a series of calibration blocks, each having a notch or recess of a known, highly accurate depth. If individual blocks are used, it is necessary to first use a zero datum block with a highly accurate flat surface to establish the zero datum. This block is then removed from the test fixture and replaced with a block with a recess of known depth and the resulting reading of the display is recorded. These calibration techniques are performed with the indicator removed from the Almen gage.

SUMMARY OF THE INVENTION

According to the present invention, the test block is of a size and shape to fit between the locator posts on the Almen gage test surface which locate the test strips in the proper position when the gage is used. The design of the test block used in the present invention includes both the zero datum flat surface and the measurement recess or notch on the same surface of the test block, instead of using a separate test block or a surface on the other side of the test bock as the zero datum surface. This significantly improves accuracy, since the recess or notch depth can be accurately measured from the same surface as the zero datum, and not referred to a surface on the opposite side of the test block or on a separate test block, which may or may not be parallel to the surface from which the depth of the notch or recess is cut. By using the same flat surface to both establish the zero datum and reference the notch depth, accuracy is increased, because a reference surface on the opposite side of the test block may not be in a plane that is perfectly parallel to the surface in which the notch is cut.

Another advantage of the invention is that the time required for calibration is significantly reduced. Clearly, time is saved because the indicator need not be removed and then reinstalled on the Almen gage stand. Furthermore, the width of the test block is substantially the same as the width of the test strip, but the length of the test block is somewhat less than the length of the test strip, so that the test block may be moved between either of the two positions in the measurement location. Accordingly, the test block may be initially located with the flat surface at the measurement position, and, after the indicator is zeroed out, the test block may then be moved to bring the notch over the measurement position.

BRIEF DESCRIPTION OF THE DRAWINGS

These and other advantages of the present invention will become apparent from the following description, with reference to the accompanying drawings, in which:

FIG. 5 a fragmentary elevation view of the portion of the gage in FIG. 1 including the measuring surface, with the calibration block used to calibrate the gage in FIG. 1 shown installed thereon in a position effecting the calibration measurement; and FIG. 6 is a view similar to FIG. 5 but illustrating the calibration block in a position effecting a zero datum measurement.

DETAILED DESCRIPTION

Figure 1:
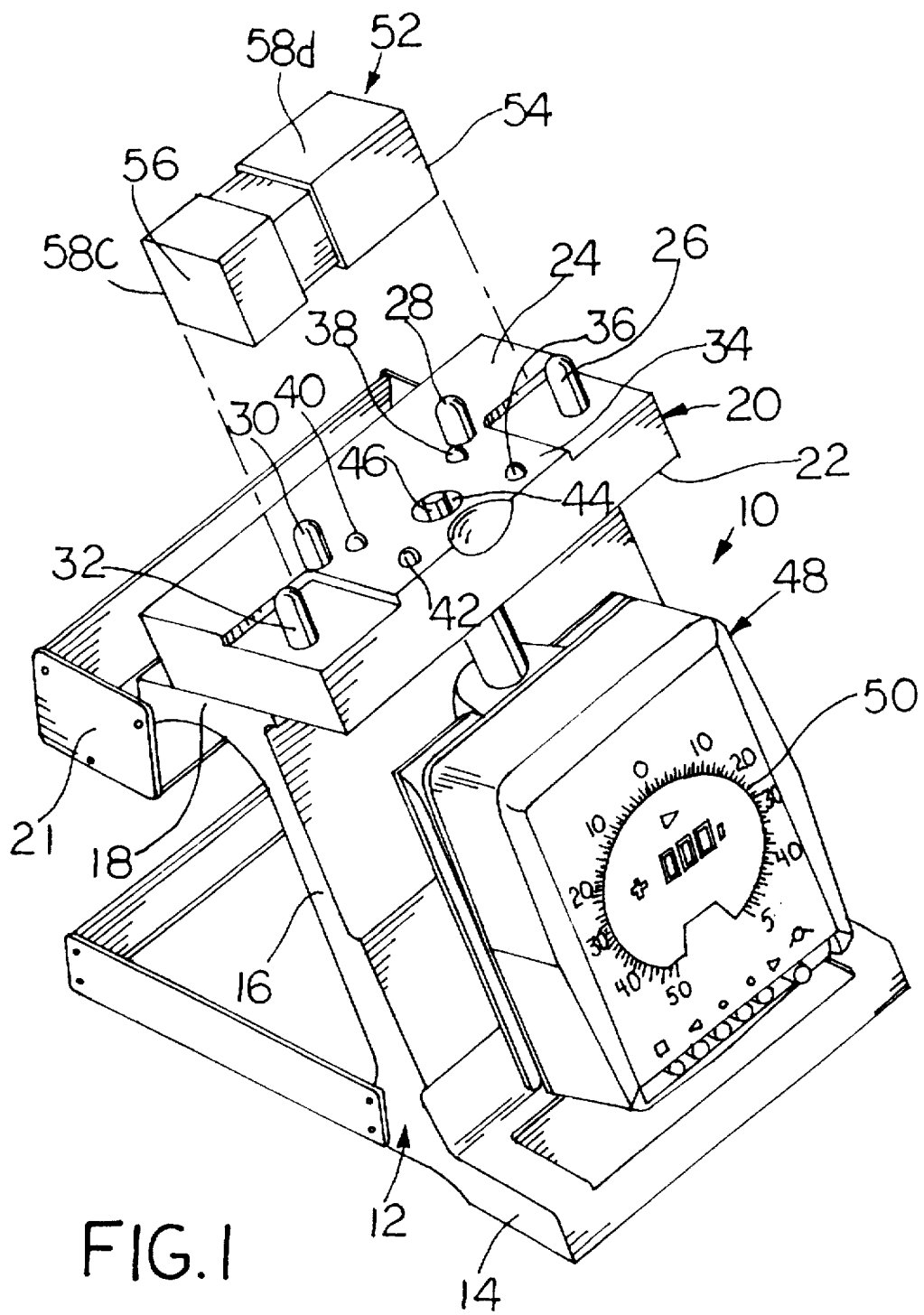
FIG. 1 is a view in perspective of the gage and calibration block mode according to the present invention, the calibration block being illustrated raised off of the position it assumes when calibration is effected.
Figure 2:
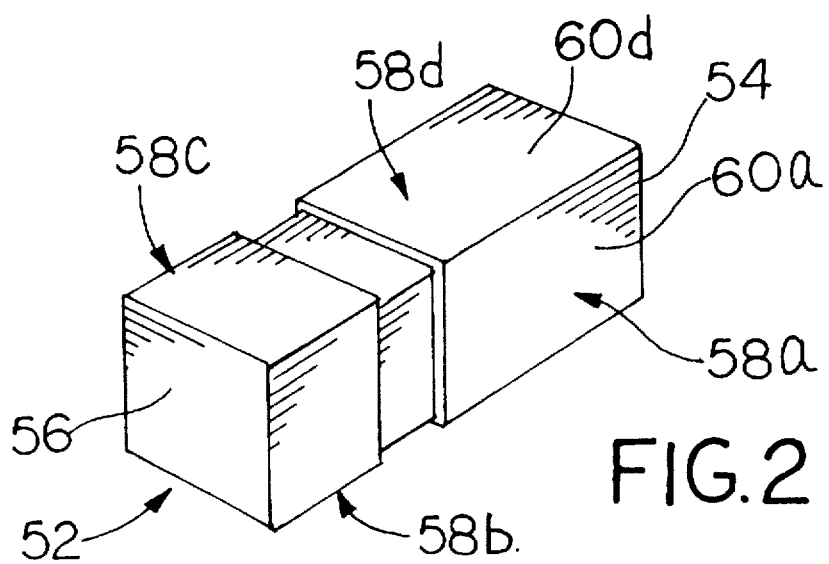
FIG. 2 is a view in perspective of the calibration block used to calibrate the gage shown in FIG. 1.
Figure 3:
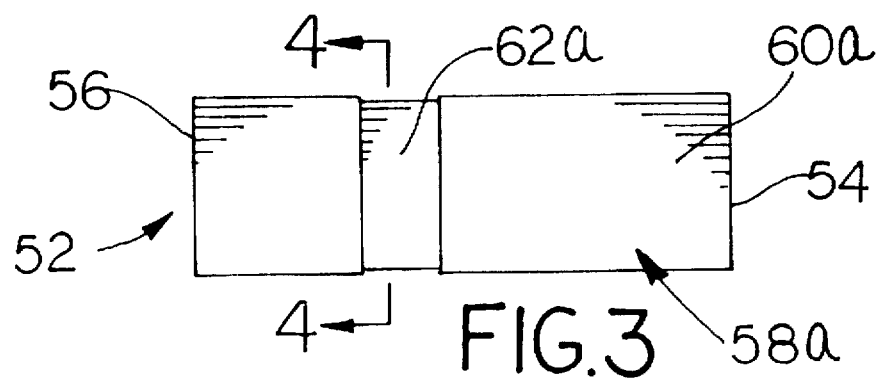
FIG. 3 is a side elevation view of the calibration block illustrated in FIG. 2.

Referring now to the drawings, an Almen gage generally referred to by the numeral 10 is conventionally used to measure the curvature of test strips (not shown). The gage 10 includes a stand 12 with a lower support base 14 and a back 16 extending generally upwardly from the support base 14 and terminating in a generally flat surface 18 upon which a test platform 20 is mounted. A tray 21 is mounted on the stand 12. Test strips (not shown) can be stored within the tray 21 for convenient access during testing.

Test platform 20 includes a lower surface 22 which is secured to the surface 18 and an opposite upper surface 24. Four alignment posts 26, 28, 30 and 32 project upwardly from upper surface 24. The posts 26–32 are used to align the ends of a test measurement strip (not shown) when a measurement is to be made. Accordingly, the posts 26–32 define a measurement surface 34 on upper surface 24 of the test platform 20. Semi-spherical surfaces 36, 38, 40 and 42 extend upwardly from test surface 34. A test strip (not shown) is held against the spherical surfaces 26–42 when a test measurement is made. An aperture 44 extends through the test platform 20 and receives a reciprocating plunger or feeler generally indicated by the numeral 46. The plunger 46 is a part of a conventional indicator generally indicated by the numeral 48. The distance plunger 46 moves is reflected on indicator dial 50 on the face of indicator 48. The plunger 46 is springloaded upwardly as in FIG. 1 and contacts the forementioned test strips to provide a measurement of the amount of curvature of the test strips above the upper surfaces of the spherical surfaces 36–42, in the conventional manner well-known to those skilled in the art.

To properly measure the intensity of shot blasting, the deflection of the test strip from the zero datum must be measured with extreme accuracy. Accordingly, the Almen gage 10 must be calibrated on a regular basis according to the invention, a calibration block indicated by the numeral 52 is used to calibrate the gage 10. Calibration block 52 has a length somewhat less than the length of a conventional test strip (not shown). For example, the length of a conventional type test strip is three inches; the length of the calibration block 52 is two inches. The width and height of the calibration block 52 are each equal to the width of the test strips. Accordingly, the block 52 is placed on the test surface 34 with one end 54 of the block in engagement with the post 26. Since the length of the test block 52 is less than the length of the test strip, the test block may be shifted relative to the test surface 34 from a position in which the end 54 engages the post 26 to a position in which the opposite end 56 engages the post 32.

Figure 4:
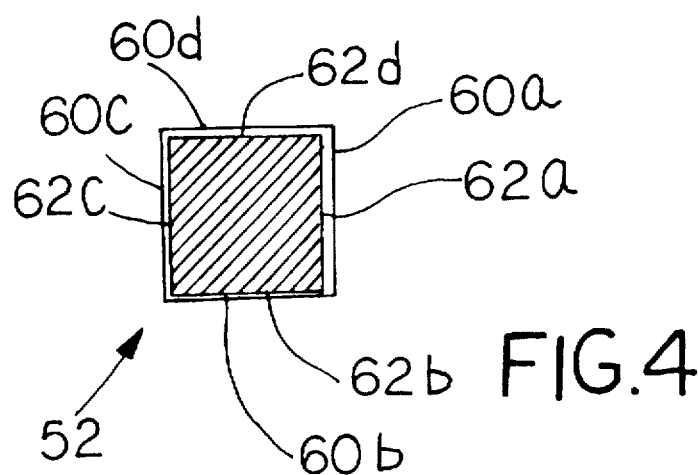
FIG. 4 is a cross-sectional view taken substantially along lines 4—4 of FIG. 3.

The sides of the test block 52 define test surfaces 58a, 58b, 58c and 58d. Each of the test surfaces 58a–d includes a flat portion 60 with a notch 62 known, precisely controlled depth, in the flat surface 60. The depth of the notch, as most clearly shown in FIG. 4, is different for each of the test surfaces 58a–d. When the block 52 as in the FIG. 5 position, the flat surface 60 is supported by the protruding hemispherical circles 36–42 and the recess or notch 62 is disposed over the plunger 46. When the block 52 is disposed in the FIG. 6 position, the end 56 of the block is engaged with post 32 and the flat surface 60 remains supported by hemispherical surfaces 36–42. In this case, however, the plunger 46 is also engaged with the flat surface 60.

When calibration of the gage 10 is to be effected, one of the faces of test block 52 is selected having a notch 62 of the depth to which calibration is to be effected. The block 52 is placed on the measurement surface 34 in the position illustrated in FIG. 6 in which the hemispherical surface 36–42 and the plunger 46 all engage the flat surface 60. The flat surface 60 is machined to be perfectly flat, so that the dial 50 can be zeroed with the plunger bearing against this flat surface. The block 52 is then moved to the FIG. 5 position in which the hemispherical support surfaces 36–42 still engage the flat surface 60, but the plunger 46 engages the notch 62. The reading on the dial 50 is then compared to the known depth. It will be noted that block 52 is supported by the hemispherical support surfaces 36–42 on the very same flat surface 60 for which the zero datum measurement was taken with the block in the FIG. 6 position. In prior art calibration techniques, zero datum blocks were available, but separate calibration blocks were used. Accordingly, there was no guarantee that the flat surface on the zero datum block was perfectly parallel to the flat surface on the calibration block used to effect the calibration measurement. Even if the zero datum surface is provided on another face of the same calibration block, there is no assurance that this face is parallel to the face in which the calibration notch recess is provided. In the present invention, the calibration can be made without removing the indicator 48 and by merely moving the calibration block side to side within the measurement area. Accordingly, the same flat surface 60 is used for the zero datum calibration that is referenced by the depth of the notch 62 for which the calibration measurement is made. Since notches of varying depths are provided on the various faces 58a–58d of the calibration block 52, the gage 48 can be calibrated for several different measurements. Accordingly, time is saved not only because the indicator need not be removed from the gage, but because both the zero datum measurement and the calibration measurement would be made by merely shifting the calibration block 52 back and forth without removing it from the gage. Time is saved and accuracy is therefore increased.

What is claimed:

1. Method of calibrating shot blasting test gage used to measure intensity of shot blasting against an elongated test strip, aid gage including a stand carrying a platform defining a test surface, locators extending from said test surface for locating said test strip in a measuring location on said test surface, an indicator mounted on said stand for measuring deflection of said strip at a measurement position between said locators, and a test block having a substantially flat surface and a recess of a measurement depth in and extending from said flat surface, said method including the steps of placing said test block between said locators with the flat surface at said measurement position, zeroing out said indicator with the flat surface at the measurement location, shifting said test block to bring said recess to said measurement position, using said flat surface to support said test block on the test surface with the recess in the measurement position whereby the same flat surface used to zero out the indicator is used to support the recess in the measurement position, and reading a calibration measurement on said indicator.

2. Method of calibrating as claimed in claim 1, wherein said test block is shorter than the test strip, and said method includes the step of moving the test block relative to the platform from a first position in which the test block is engaged with a first set of said locators and the flat surface is disposed in the measurement position to a second position in which the test block in engaged with another set of said locators and the recess is disposed in the measurement position.

3. Method of calibrating as claimed in claim 2, wherein said method includes the step of sliding said test block relative to said platform to move said test block between said first and second positions.

4. Method of calibrating as claimed in claim 1, wherein said locators are pins projecting from said platform, and said method includes the steps of placing said test block in engagement with a least some of said pins to dispose said block with the flat surface in said measurement position and moving said test block along said platform to engage said test block with other pins to dispose said recess in said measurement position.

5. Method of calibrating as claimed in claim 1, wherein said test block has multiple test faces and a recess and a flat surface on each of said multiple test faces, said method including the step of using a selected one of the flat surfaces to zero out the indicator and the recess in the selected one of the flat surfaces to make the calibration measurement.

6. Method of calibrating as claimed in claim 4, wherein said indicator includes a feeler extending through said platform at said measurement position, and said method includes moving said test block relative to said platform to engage said feeler with the flat surface and then the recess with the feeler.

7. In combination, a test gage used to measure intensity of shot blasting against an elongated test strip and a test block for calibrating said test gage, said test gage including a stand carrying a platform defining a test surface, locators extending from said test surface for locating said test strip in a measuring location on said test surface, an indicator mounted on said stand for measuring deflection of said test strip at a measurement position between said locators, said test block having a substantially flat surface and a recess of a measurement depth in and extending from said flat surface, said test block being located in said measuring location by said locators when calibration of said test gage is effected in either of a pair of positions, one of said positions disposing said flat surface in said measurement position with said recess displaced from the measurement position and facing said test surface, the other position disposing said recess in said measurement position with said flat surface engaging said test surface to support the test block with the recess in the measurement position.

8. The combination as claimed in claim 7, wherein said test block in said one position engages one set of said locators and in said other position engages another set of said locators.

9. The combination as claimed in claim 7, wherein said test block has a width equal to the width of the test strip and a length less than the length of the test strip, whereby the test block may be shifted between said one and said other positions within said measurement location.

10. The combination as claimed in claim 7, wherein said locators are pins projecting from said test surface.

11. The combination as claimed in claim 7, wherein said test block has multiple test faces and a recess and a flat surface on each of said multiple test faces, whereby the flat surface on a selected one of the faces is used to zero out the indicator and the recess on the selected face is used to make the calibration measurement.

12. The combination as claimed in claim 7, wherein said indicator includes a feeler extending through said platform at said measurement position, said test block being movable relative to said platform to engage said feeler with the flat surface and then the recess with the feeler.

* * * * *